(12) United States Patent
Muenzenberger

(10) Patent No.: US 10,422,447 B2
(45) Date of Patent: Sep. 24, 2019

(54) SEALING ASSEMBLY AND A SEALING SEGMENT

(71) Applicant: HILTI AKTIENGESELLSCHAFT, Schaan (LI)

(72) Inventor: Herbert Muenzenberger, Wiesbaden (DE)

(73) Assignee: HILTI AKTIENGESELLSCHAFT, Schaan (LI)

( * ) Notice: Subject to any disclaimer, the term of this patent is extended or adjusted under 35 U.S.C. 154(b) by 0 days.

(21) Appl. No.: 15/518,840

(22) PCT Filed: Dec. 11, 2015

(86) PCT No.: PCT/EP2015/079347
§ 371 (c)(1),
(2) Date: Apr. 13, 2017

(87) PCT Pub. No.: WO2016/092055
PCT Pub. Date: Jun. 16, 2016

(65) Prior Publication Data
US 2017/0241572 A1    Aug. 24, 2017

(30) Foreign Application Priority Data
Dec. 11, 2014   (EP) .................................... 14197290

(51) Int. Cl.
*F16L 5/02*     (2006.01)
*H02G 3/22*    (2006.01)
(Continued)

(52) U.S. Cl.
CPC ................ *F16L 5/02* (2013.01); *A62C 2/065* (2013.01); *F16L 5/04* (2013.01); *H02G 3/22* (2013.01)

(58) Field of Classification Search
CPC ... F16L 5/02; F16L 5/04; A62C 2/065; H02G 3/22
See application file for complete search history.

(56) References Cited

U.S. PATENT DOCUMENTS

| 650,753 A | * | 5/1900 | Gibson | .................. | F16B 43/00 |
| | | | | | 277/546 |
| 885,052 A | * | 4/1908 | Jensen | .................. | F16B 43/00 |
| | | | | | 301/68 |

(Continued)

FOREIGN PATENT DOCUMENTS

| CN | 102953405 | 3/2013 | | |
| DE | 29703352 U1 | * 5/1997 | ................ | F16L 5/02 |

(Continued)

OTHER PUBLICATIONS

International Search Report dated Mar. 24, 2016, in PCT/EP2015/079347, filed Dec. 11, 2015.

(Continued)

*Primary Examiner* — Eugene G Byrd
(74) *Attorney, Agent, or Firm* — Grüneberg and Myers PLLC

(57) ABSTRACT

A seal assembly (10) for sealing an opening (12) in a wall (14) or ceiling of a building, especially for sealing a line penetration, wherein the seal assembly (10) is able to cover the opening (12) and has a passage (32) for a line (18), has at least two disk-like seal segments (16), which together define the passage (32) at inside rim portions and in circumferential direction overlap at adjacent rims (22). A seal segment (18) for such an assembly has an elastic sealing compound (26) that is applied on a carrier film (28).

19 Claims, 3 Drawing Sheets

(51) Int. Cl.
*A62C 2/06* (2006.01)
*F16L 5/04* (2006.01)

(56) References Cited

U.S. PATENT DOCUMENTS

| | | | | |
|---|---|---|---|---|
| 1,452,492 | A * | 4/1923 | Carpenter | F16B 43/007 |
| | | | | 301/68 |
| 3,757,031 | A * | 9/1973 | Izraeli | H02G 15/113 |
| | | | | 138/155 |
| 4,331,254 | A * | 5/1982 | Haggerty | B65D 90/28 |
| | | | | 215/247 |
| 4,407,023 | A * | 10/1983 | Norton | E03C 1/042 |
| | | | | 137/359 |
| 4,490,954 | A | 1/1985 | Cresti | |
| 4,758,003 | A * | 7/1988 | Goldstein | F16L 5/04 |
| | | | | 174/76 |
| 4,989,278 | A * | 2/1991 | Kostorz | E03C 1/042 |
| | | | | 137/359 |
| 5,246,345 | A * | 9/1993 | Adams, Jr. | B63H 5/165 |
| | | | | 416/146 R |
| 5,402,830 | A * | 4/1995 | Dortzbach | F16L 7/00 |
| | | | | 138/110 |
| 6,161,589 | A | 12/2000 | Bolotte et al. | |
| 7,645,946 | B2 * | 1/2010 | Smith | F16L 5/02 |
| | | | | 174/650 |
| 7,770,335 | B2 * | 8/2010 | Evensen | E04D 13/1407 |
| | | | | 52/219 |
| 8,438,804 | B2 | 5/2013 | Nowoczin et al. | |
| 2009/0320392 | A1 | 12/2009 | Nowoczin et al. | |
| 2013/0248245 | A1 * | 9/2013 | Park | H02G 3/22 |
| | | | | 174/650 |

FOREIGN PATENT DOCUMENTS

| | | | | |
|---|---|---|---|---|
| DE | 29911070 U1 * | 10/1999 | | F16L 5/02 |
| DE | 102007052278 A1 * | 5/2009 | | E04D 12/002 |
| EA | 200970133 | 6/2009 | | |
| EP | 1614824 A2 * | 1/2006 | | E04D 12/002 |
| EP | 2397737 A1 | 12/2011 | | |
| JP | 9-280426 | 10/1997 | | |
| JP | 11-230424 | 8/1999 | | |

OTHER PUBLICATIONS

"Technisches Merkblatt MEM Bitumen-Band", XP055193308, http://www.mem.de/uploads/media/TM_Bitumen-Band_01.pdf, Jul. 1, 2008, 3 pages.

* cited by examiner

SEALING ASSEMBLY AND A SEALING SEGMENT

The invention relates to a seal assembly for sealing an opening in a wall or ceiling of a building, especially for sealing a line penetration, wherein the seal assembly is able to cover the opening while leaving a passage for a line. The invention further relates to a seal segment for such an assembly.

From the prior art it is known to use intumescent or fireproof duroplastic sealing compounds in order to close openings in walls or ceilings in buildings. The kneadable compound is pressed or injected into the openings and, by virtue of the plastic properties, is able to conform to the shape of the opening and to close it completely. In particular, such good sealing of the opening is possible for line penetrations.

To simplify the handling of such sealing compounds, it is further known to apply the sealing compound on an elastic carrier layer. Thus prefabricated disks are available, with which an opening can be sealed. As an example, the disks have annular structure, wherein a radially directed slit is provided, so that the disk can be positioned around an already mounted line or cable. A circular passage for the line is often provided at the center. For mounting, the disk is positioned around the line and then pressed against the wall or the ceiling, to which the disk is able to adhere by virtue of the self-bonding properties of the sealing compound. Adaptation to the diameter of the line or of the cable is possible by overlapping the rim areas bordering the slit.

By virtue of the self-bonding properties of the kneadable compound, however, it may occur that, while being positioned around the line, it may already bond permanently to this or to the wall. In addition, only limited adaptation to different line diameters is possible. If the rims of the disk are overlapped, the disk becomes deformed to a funnel-like shape. Consequently, pressing against the wall or the ceiling is possible only to a limited extent, especially when the disk is positioned around a line with very small diameter. Certainly adaptation may be achieved by reducing the size of the passage. In this case, however, use for larger line diameters is not possible.

The object of the invention is to provide a seal assembly as well as a seal segment for such an assembly that permit simpler mounting of the seal assembly as well as more flexible use for line penetrations with various line diameters.

The object is solved by providing a seal assembly for sealing an opening in a wall or ceiling of a building, especially for sealing a line penetration, wherein the seal assembly is able to cover the opening and has a passage for the line. The seal assembly has at least two disk-like seal segments, which together define the passage at inside rim portions and in circumferential direction overlap at adjacent rims.

According to the invention, the inventive seal assembly consists of several seal segments, which are used in combination. The number of seal segments may be varied, although two seal segments are in principle sufficient to achieve sealing of the opening. The seal segments are respectively positioned around the line, especially from different directions, and are also placed against the wall and together seal the opening in the building. The combination of several parts from different directions has the advantage that no deformation of the individual seal segments is necessary in order to mount the seal assembly. In this way, bonding with the seal segments themselves or with the wall before the individual seal segments have reached their final mounting position can be largely ruled out. A further advantage is that the size of the passage for the line can be varied more easily, by positioning the seal segments closer to one another or further away from one another, in a manner similar to that of a diaphragm shutter of a photographic apparatus. In contrast to the known one-piece seal assemblies, the seal segments do not have to be deformed but instead continue to retain flat, disk-like shape, so that bonding with the wall or ceiling in a manner that is as flat as possible can be achieved.

In order to permit a sufficient overlap area and thus the best possible closing of the opening, the seal segments are preferably shaped as circular sectors, and in particular the seal segments describe a central angle of 200° to 280°. Thereby the seal segments have a substantially V-shaped notch, wherein the passage is partly defined preferably at the junction of the two V-shaped rims. In the case of use of two or more seal segments, which are aligned with the V-shaped notches opposite one another, a diamond-shaped or polygonal cutout constituting the passage is formed between the seal segments. The size and the shape of this passage can be varied by pushing the seal segments together, so that adaptation to a large number of different line cross sections is possible.

In order to further improve the capabilities of the seal assembly to adapt to an opening or to the line routed through this opening, the seal segments preferably have a cutout, which defines portions of the passage. This cutout is preferably provided in the junction area of the rims that converge in V-shaped relationship and that define the circular sector. In particular, this cutout has the shape of a circular sector, so that adaptation to a round line is possible, and/or the cutout is disposed at the center of the circular-sector-shaped seal element.

As an example, the seal segments consist of an elastic and/or plastically deformable sealing compound, which is applied on a carrier film. A plastically deformable sealing compound permits good adaptation to the surface of the wall or of the ceiling as well as to the opening, whereby very good sealing of the opening can be achieved. Processing of the seal segments is greatly simplified by the carrier film, since this stabilizes the sealing compound and holds it in a disk-like shape. In addition, when the seal assembly is in mounted condition, the carrier film provides protection for the sealing compound, so that this is protected from mechanical stresses and strains.

The back side of the seal segments disposed opposite the carrier film is preferably designed to be self-adhesive, so that the seal segments are able to adhere with this back side to the surface of the wall or of the ceiling or to other seal segments. Thereby easy mounting of the seal segments and thus of the seal assembly is possible. Further adaptation to the wall or the ceiling is achievable due to the plastic properties of the sealing compound.

In order to simplify the transportation or the handling of the seal segments, preferably a transportation protection film, which can be stripped off immediately before mounting of the seal segments, is applied on the back side. Thereby inadvertent adhesion of the seal segments to the line or to one another, for example during transportation, can be reliably ruled out.

In order to improve the fire protection properties, the sealing compound may contain substances such as fire-resistant additives. As an example, the sealing compound may be designed to be flame-retarding or intumescent, so that it swells under the effect of heat and thus is able to close defects that may develop in the opening in the event of fire, for example due to a melting line.

The seal segments are preferably die-cut from a flat material. During this die-cutting, the carrier film is drawn partly over the die-cut edges, so that these are additionally protected from mechanical stress and strain.

The object is further solved by providing a seal segment for such an assembly, wherein the seal segment has an elastic sealing compound that is applied on a carrier film.

The seal segment preferably has a thickness of at most 7 mm, whereby a sufficient material thickness is present that irregularities in the surface of the wall or ceiling can also be evened out and thus sealing of the opening can be ensured.

Further advantages and features will become apparent from the description hereinafter in conjunction with the attached drawings, wherein.

Figure 1:
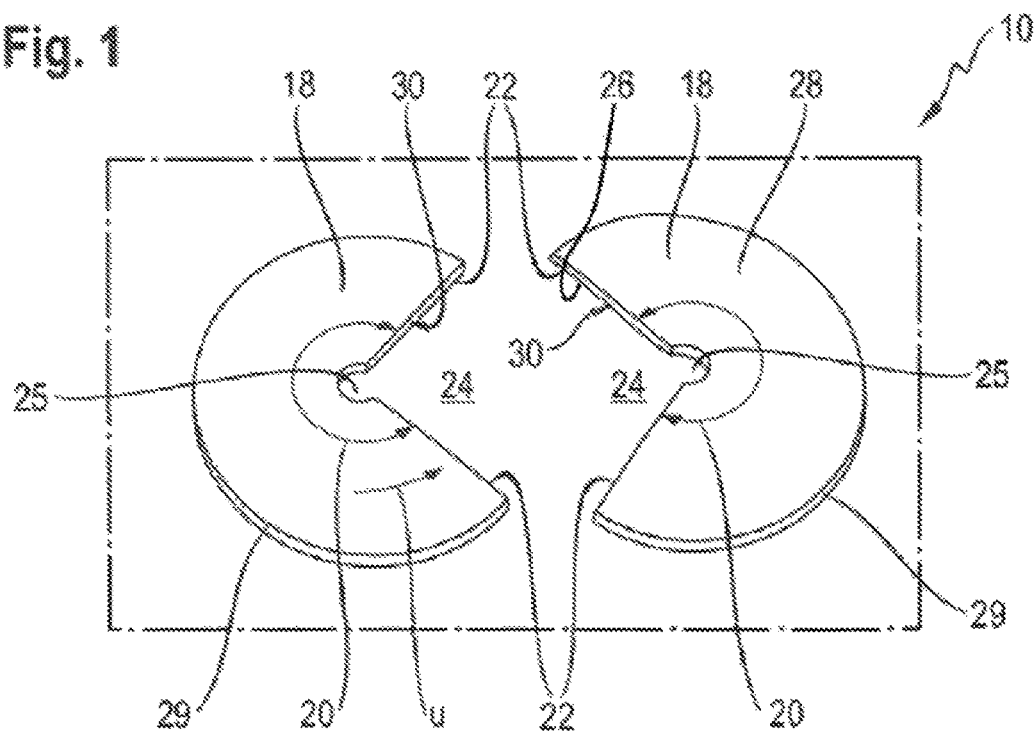
FIG. 1 shows a perspective view of an inventive seal assembly.
Figure 3:
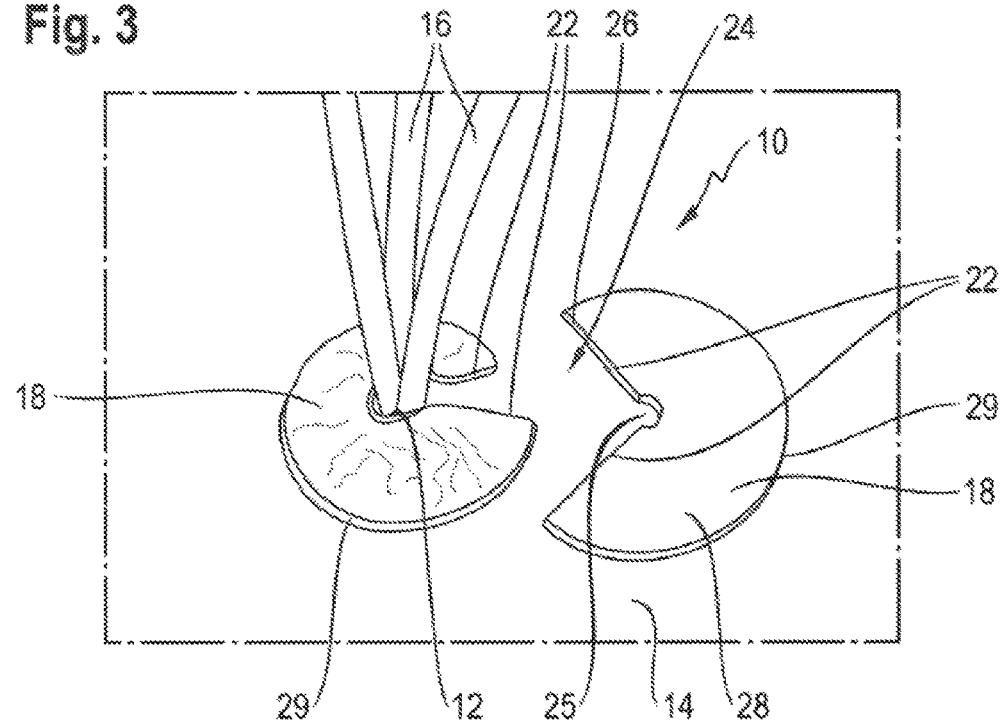
FIG. 3 shows a second step of mounting of the seal assembly from FIG. 1.
Figure 4:
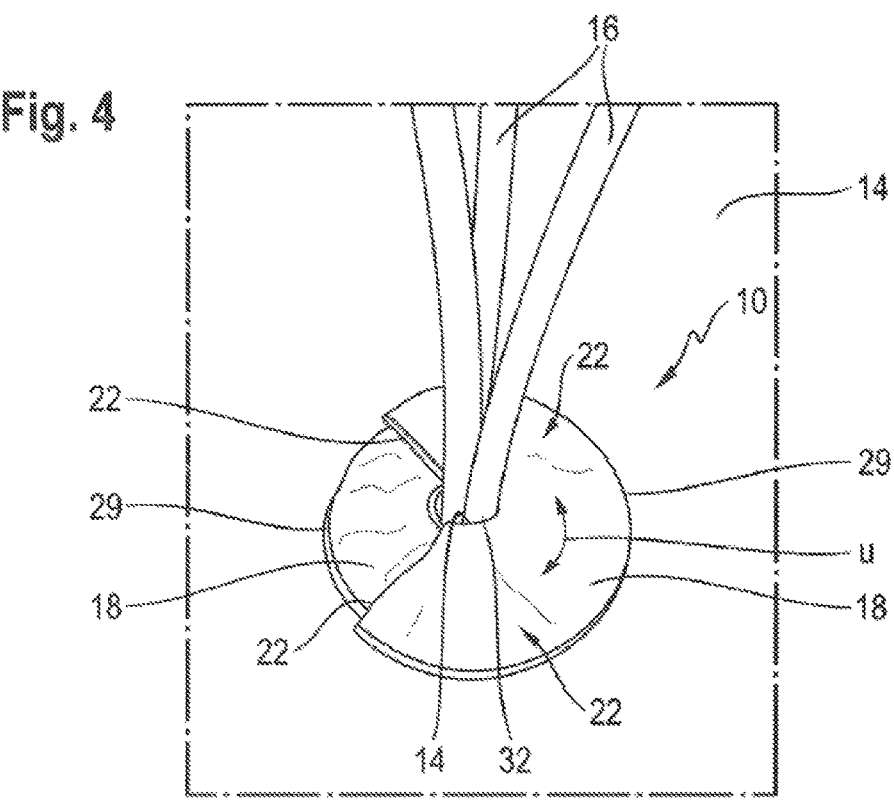
FIG. 4 shows the seal assembly from FIG. 1 in mounted condition.
Figure 5:
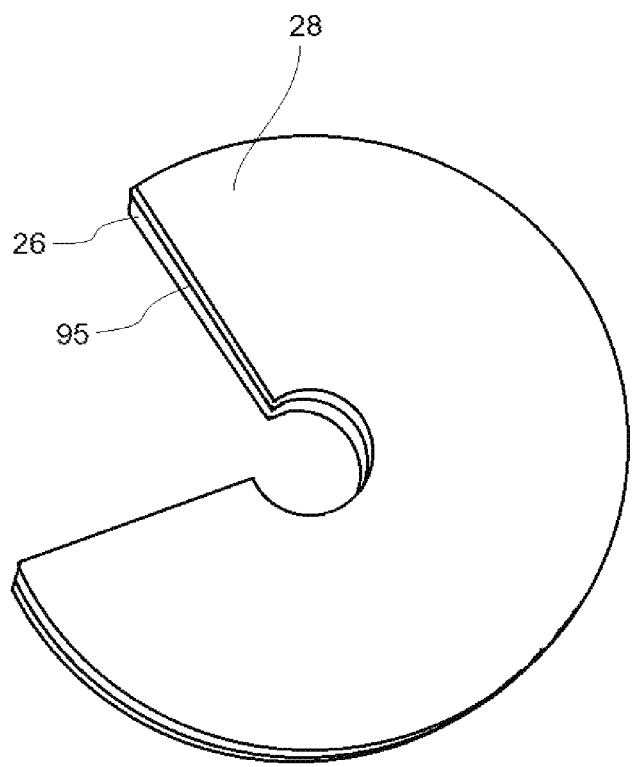
Figure 6:
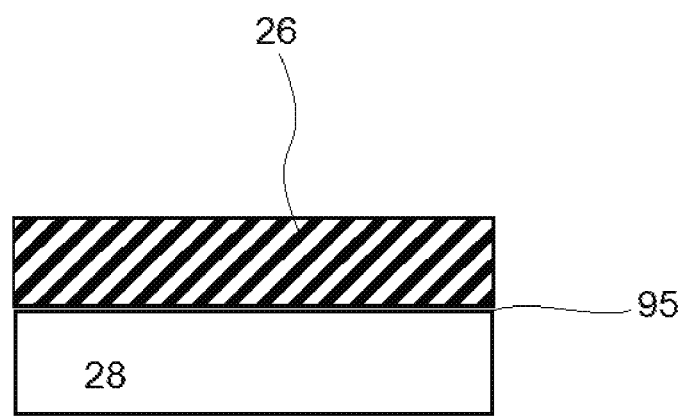

FIG. 5 shows an example of a carrier film and sealing compound of each of a plurality of seal segments of the seal assembly, and FIG. 6 shows a cross section of an example of a carrier film and sealing compound of each of a plurality of seal segments of the seal assembly FIG. 1 shows a seal assembly 10 for an opening 12 (see also FIGS. 2 to 4) in a wall 14 or a ceiling of a building, especially a line penetration for a line 16. Seal assembly 10 has two seal segments 18, which are of identical shape in the embodiment shown here. However, it is also conceivable for different seal segments to be used and/or for seal assembly 10 to have more than two seal segments 18.

Seal segments 18 are each designed as flat circular sectors that describe a central angle 20 of approximately 280°.

Each sealing segment 18 has two free rims 22, which are oriented in substantially radial direction and between them define a substantially V-shaped notch 24.

In each case, central angle 20 of the seal segments is larger than 180°, preferably larger than 200°, so that free rims 22 are oriented in the shape of a V relative to one another.

A cutout 25 in the form of a circular sector is provided at the center of each seal segment 18, and, as will be illustrated hereinafter, forms portions of a passage 32 for line 16.

Each seal segment consists of an elastic and/or plastically deformable sealing compound 26, which is applied on a carrier film 28, as shown in FIG. 5 and FIG. 6.

To produce the base material for such seal segments 18, sealing compound 26, for example a duroplastic butyl rubber mixture, is extruded onto a flat material, for example onto a transportation protection film, to which sealing compound 26 does not adhere or adheres only slightly. Then a carrier film 28, which bonds with sealing compound 26, is applied onto sealing compound 26, thus forming a substance-to-substance joint 95 as shown in FIG. 5 and FIG. 6. Finally, seal segments 18 are die-cut from this plate-like material.

Die-cutting has the advantage that carrier film 28 is pressed against the surface of sealing compound 26, in addition to which carrier film 28 is drawn partly around the die-cut edges, in this case rims 22 as well as outer circular rim 29, so that these are reliably protected.

Sealing compound 26 itself is usually designed to be self-adhesive, wherein the transportation protection film applied on the back side prevents seal segments 18 from adhering to one another or to other objects.

As an example, sealing compound 26 is designed to be fire-retardant, and it may additionally contain fire-resistant additives, for example intumescent material.

Figure 2:
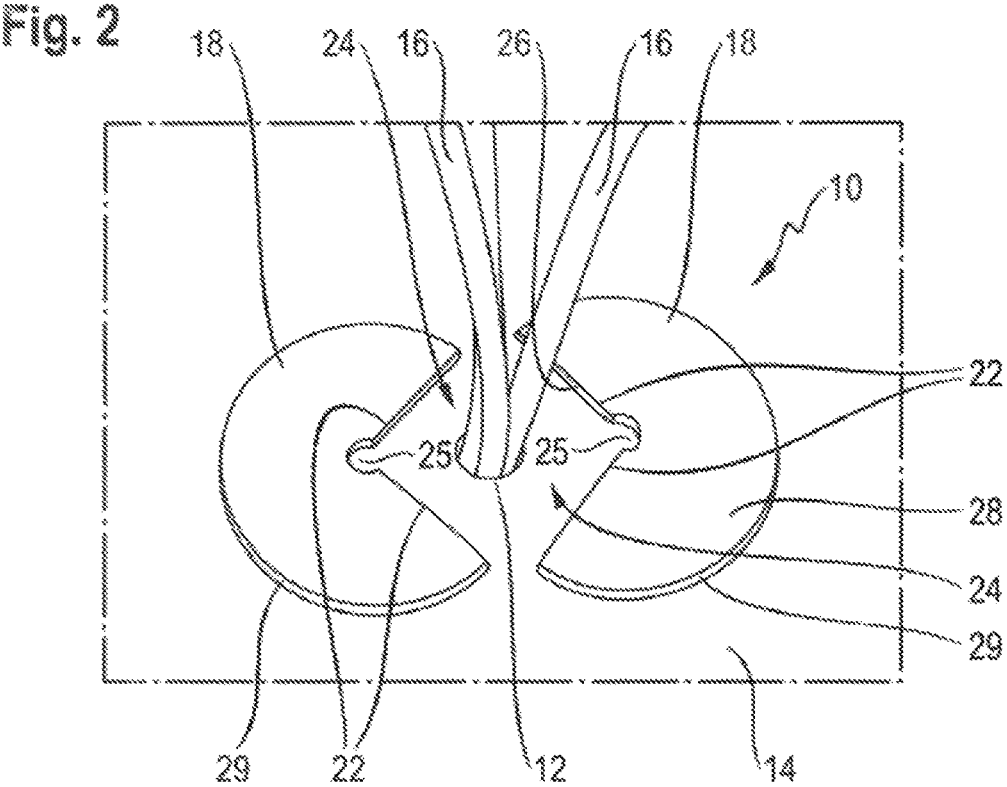
FIG. 2 shows a first step of mounting of the seal assembly from FIG. 1.

At least two such seal segments 18 are used to seal an opening 12 (FIG. 2). Firstly the transportation protection film is stripped from a seal segment 18, which is then positioned with circular-sector-shaped cutout 25 around line 16 and pressed with back side 30 against the surface of wall 14, so that seal segment 18 bonds to wall 14 and if necessary to line 16 also. As is evident in FIG. 3, good adaptation to line 16, opening 12 or wall 14 is possible due to the duroplastic properties of sealing compound 26 as well as the flexibility of carrier film 28.

Then second seal segment 18 is guided, also in radial direction relative to lines 16, but in opposite direction, against line 16 and wall 14. Second seal segment 18 is positioned around line 16 in such a way that rims 22 of both seal segments 18 overlap in circumferential direction U. Thereby very good sealing of seal assembly 10 is assured at rims 22.

The size of passage 32, which is defined by cutouts 25, can be adapted by pushing seal segments 18 closer to one another or by leaving a larger distance between them. In addition, rims 22 can be positioned around line 16 in such a way that reliable sealing of seal segments 18 and thus of seal assembly 10 against line 16 is established.

Since the two seal segments 18 do not have to be deformed or have to be deformed only slightly for mounting of seal assembly 10, whereby simple mounting of seal assembly 10 is assured. Undesired bonding of seal segments 18 to line 16, wall 14 or of seal segments 18 to one another before they have reached their final mounting position is reliably ruled out.

Thus seal assembly 10 according to the invention permits easier mounting as well as very flexible adaptation to openings 12 of different size or to various diameters of line 16.

Embodiments with several seal segments 18 are also possible instead of the embodiment with two seal segments 18 shown here. These merely have to be designed in such a way that free ends 22 of adjacent seal segments are overlapped in circumferential direction, so that opening 12 can be completely closed.

The invention claimed is:

1. A seal assembly, comprising:
   a passage for a line, and
   at least two disk-like seal segments, each comprising inside rim portions which form a substantially V-shaped notch in each segment, wherein the seal segments together define the passage at the inside rim portions and which in circumferential direction overlap at adjacent rims, wherein said seal assembly is suitable for sealing an opening in a wall or ceiling of a building and is able to cover the opening, wherein each of the seal segments includes an elastic and/or plastically deformable sealing compound which is applied on and covers an exterior surface of a carrier film, and wherein back sides of the seal segments are self-adhesive, the sealing compound on the back side of a first one of the seal segments facing and adhering to the wall or ceiling and the sealing compound on the back side of a second one of the seal segments facing and adhering to at least a portion of the first one of the seal segments at an area where the seal segments overlap, the sealing compound of the second one of the seal segments at least partially disposed between the carrier films of the first and second ones of the seal segments.

2. The seal assembly according to claim 1, wherein the seal segments are shaped as at least partially circular sectors.

3. The seal assembly according to claim 1, wherein the seal segments have a cutout in a junction area of the rims.

4. The seal assembly according to claim 3, wherein a transportation protection film is applied on the sealing compound of each of the first and second ones of the seal segments prior to adherence.

5. The seal assembly according to claim 1, wherein the sealing compound comprises a fire-resistant additive.

6. The seal assembly according to claim 1, wherein the seal segments are die-cut.

7. The seal assembly according to claim 1, wherein the seal segment has a thickness of at most 7 mm.

8. The seal assembly according to claim 1, which is suitable for sealing a line penetration.

9. The seal assembly according to claim 2, wherein the rims of each of the seal segments are spaced by an angle of 200° to 280°, along a path which does not pass through the notch, in the circumferential direction.

10. The seal assembly according to claim 3, wherein each of the cutouts has a shape of an at least partially circular sector which together define respective portions of the passage.

11. The seal assembly according to claim 1, wherein the sealing compound is an intumescent or flame-retardant sealing compound.

12. The seal assembly according to claim 1, wherein the sealing compound comprises a duroplastic butyl rubber mixture.

13. The seal assembly according to claim 1, wherein the seal segments are obtained by a process comprising extruding the sealing compound onto a flat material to which the sealing compound does not adhere, and then applying the carrier film onto the sealing compound.

14. The seal assembly according to claim 13, wherein the process to obtain the seal segments further comprises die-cutting the seal segments, thereby obtaining a die-cut edge and drawing the carrier film partly over the die-cut edge.

15. The seal assembly according to claim 1, wherein the carrier film stabilizes the sealing compound and holds it in a disk-like shape.

16. The seal assembly according to claim 1, wherein the carrier film is a flexible carrier film.

17. The seal assembly according to claim 1, wherein a portion of at least one of the rims of at least one of the seal segments deforms to form at least a portion of the passage, said deformation causing the rims of the seal segments to be asymmetrically offset relative to another one of the rims of the at least one of the seal segments.

18. The seal assembly according to claim 1, wherein a size of the passage is different from a size of the cutout in each of the seal segments.

19. The seal assembly according to claim 1, where a spacing between the rims in each seal segment is different from a size of the passage.

* * * * *